United States Patent
Xu et al.

(10) Patent No.: US 12,529,673 B2
(45) Date of Patent: Jan. 20, 2026

(54) COMPOSITIONS AND METHODS FOR IMPROVED CALIBRATION ACCURACY OF CREATININE/CREATINE SENSORS AND USES THEREOF

(71) Applicant: Instrumentation Laboratory Company, Bedford, MA (US)

(72) Inventors: Xiaoxian Xu, Maynard, MA (US); Prasad Pamidi, Burlington, MA (US); David Raimondi, Bedford, MA (US); Miklos Erdosy, Groton, MA (US)

(73) Assignee: Instrumentation Laboratory Company, Bedford, MA (US)

( * ) Notice: Subject to any disclaimer, the term of this patent is extended or adjusted under 35 U.S.C. 154(b) by 1420 days.

(21) Appl. No.: 16/429,886

(22) Filed: Jun. 3, 2019

(65) Prior Publication Data

US 2020/0319210 A1 Oct. 8, 2020

Related U.S. Application Data

(60) Provisional application No. 62/830,191, filed on Apr. 5, 2019.

(51) Int. Cl.
*G01N 27/327* (2006.01)
*B01D 69/12* (2006.01)
(Continued)

(52) U.S. Cl.
CPC ......... *G01N 27/3275* (2013.01); *B01D 69/12* (2013.01); *C12Q 1/002* (2013.01);
(Continued)

(58) Field of Classification Search
USPC .......................................................... 702/19
See application file for complete search history.

(56) References Cited

U.S. PATENT DOCUMENTS

| 6,960,466 B2 | 11/2005 | Pamidi et al. |
| 7,632,672 B2 | 12/2009 | Pamidi et al. |

(Continued)

FOREIGN PATENT DOCUMENTS

| CN | 102608176 A | 7/2012 |
| EP | 1753872 B1 | 1/2014 |

(Continued)

OTHER PUBLICATIONS

Mohabbati-Kalejahi, Elham, et al. "A review on creatinine measurement techniques." Talanta 97 (2012): 1-8. (Year: 2012).*

(Continued)

*Primary Examiner* — Karlheinz R. Skowronek
*Assistant Examiner* — Mary C Leverett
(74) *Attorney, Agent, or Firm* — ArentFox Schiff LLP

(57) ABSTRACT

Techniques includes measuring, using a creatine sensor, a creatine sensor current signal ($\Delta I2$) of a first calibration solution (CS2). A creatine sensor sensitivity (Slope) for the creatine sensor is based on the creatine sensor current signal ($\Delta I2$). The first calibration solution (CS2) has a known concentration of creatine (CR_CS2), a known concentration of creatinine (CREA_CS2), and a stable ratio of creatine to creatinine over a range of temperatures for a predefined shelf-life of the first calibration solution (CS2). The Techniques include measuring, using the creatine sensor, a measured creatine concentration (MCR_CS3) of a second calibration solution (CS3). The second calibration solution (CS3) has an initial known creatine concentration (CR_CS3), an initial known creatinine concentration (CREA_CS3), and an unstable ratio of creatine to creatinine that changes over the predefined shelf-life. Concentrations of creatine and creatinine in a sample are thereafter estimated.

20 Claims, 8 Drawing Sheets

(51) Int. Cl.

| | | |
|---|---|---|
| *C12Q 1/00* | (2006.01) | |
| *C12Q 1/54* | (2006.01) | |
| *C12Q 1/58* | (2006.01) | |
| *G01N 27/30* | (2006.01) | |
| *G01N 27/333* | (2006.01) | |
| *G01N 33/53* | (2006.01) | |
| *G01N 33/543* | (2006.01) | |
| *G01N 33/70* | (2006.01) | |
| *G01N 33/96* | (2006.01) | |
| *G06F 17/18* | (2006.01) | |
| *G06F 30/331* | (2020.01) | |
| *G16B 25/30* | (2019.01) | |
| *G16H 10/40* | (2018.01) | |

(52) U.S. Cl.
CPC ............ *C12Q 1/003* (2013.01); *C12Q 1/005* (2013.01); *C12Q 1/54* (2013.01); *G01N 27/308* (2013.01); *G01N 27/3272* (2013.01); *G01N 27/3276* (2013.01); *G01N 27/3335* (2013.01); *G01N 33/5308* (2013.01); *G01N 33/70* (2013.01); *G01N 33/96* (2013.01); *G06F 17/18* (2013.01); *G16B 25/30* (2019.02); *G16H 10/40* (2018.01); *C12Q 1/58* (2013.01); *G01N 27/3274* (2013.01); *G01N 33/5438* (2013.01); *G06F 30/331* (2020.01)

(56) References Cited

U.S. PATENT DOCUMENTS

| | | | |
|---|---|---|---|
| 7,815,788 | B2 | 10/2010 | Schaffar et al. |
| 7,888,061 | B2 | 2/2011 | Kjaer et al. |
| 8,426,192 | B2 | 4/2013 | Pamidi et al. |
| 9,487,811 | B2 | 11/2016 | Zhao et al. |
| 11,327,042 | B2 | 5/2022 | Xu et al. |
| 11,874,285 | B2 | 1/2024 | Kjaer et al. |
| 2003/0062262 | A1 | 4/2003 | Mansouri et al. |
| 2004/0211666 | A1 | 10/2004 | Pamidi et al. |
| 2004/0256227 | A1 | 12/2004 | Shin et al. |
| 2006/0275857 | A1 | 12/2006 | Kjaer et al. |
| 2008/0173064 | A1 | 7/2008 | Schaffar et al. |
| 2012/0181189 | A1 | 7/2012 | Merchant |
| 2017/0254771 | A1 | 9/2017 | Balasubramanian et al. |
| 2017/0260560 | A1 | 9/2017 | Merchant |
| 2017/0315139 | A1* | 11/2017 | Kjaer ................ G01N 33/70 |
| 2017/0363567 | A1 | 12/2017 | Kjaer |
| 2017/0363568 | A1 | 12/2017 | Hansen et al. |
| 2020/0319210 | A1 | 10/2020 | Xu et al. |
| 2020/0319211 | A1 | 10/2020 | Xu et al. |

FOREIGN PATENT DOCUMENTS

| | | |
|---|---|---|
| JP | S58-061459 A | 4/1983 |
| JP | S64-75000 A | 3/1989 |
| JP | 2004-506224 A | 2/2004 |
| JP | 2007-512519 A | 5/2007 |
| JP | 2018-500547 A | 1/2018 |
| JP | 2018-500564 A | 1/2018 |
| JP | S64-075000 A | 10/2018 |
| WO | 98/21356 A1 | 5/1998 |
| WO | 03/019171 A1 | 3/2003 |
| WO | 2005/052596 A1 | 6/2005 |
| WO | 2008/028011 A2 | 3/2008 |
| WO | 2009/053370 A1 | 4/2009 |
| WO | 2009/082699 A1 | 7/2009 |
| WO | 2016/096725 A1 | 6/2016 |
| WO | 2020204974 A1 | 10/2020 |

OTHER PUBLICATIONS

Pundir, C. S., Sandeep Yadav, and Ashok Kumar. "Creatinine sensors." TrAC Trends in Analytical Chemistry 50 (2013): 42-52. (Year: 2013).*

International Preliminary Report on Patentability dated Sep. 28, 2021, International Application No. PCT/US2019/035152 filed Jun. 3, 2019 (7 pages).
Examiner's Requisition for Canadian Patent Application No. 3,101,513, issued Apr. 4, 2023, (4 pages).
Communication pursuant to Article 94(3) EPC for European Patent Application No. 19734962.4, issued Nov. 17, 2022, (4 pages).
Notice of Reasons for Rejection for Japanese Patent Application No. 2020-567148, issued Oct. 14, 2021, (with English translation), 5 pages.
Nichols et al., The effect of nitric oxide surface flux on the foreign body response to subcutaneous implants, Biomaterials, vol. 33, No. 27, May 20, 2012, pp. 6305-6312.
Conway et al., Layer-by-layer design and optimization of xerogel-based amperometric first generation biosensors for uric acid, Journal of Electroanalytical Chemistry, vol. 775, May 25, 2016, pp. 135-145.
Tjell et al., Diffusion rate of hydrogen peroxide through water-swelled polyurethane membranes, Sensing and Bio-Sensing Research, vol. 21, No. 27, Nov. 1, 2018, pp. 35-39.
Hydrourethane AdvanSource Biomaterials, Advancesource Biomaterials, Jun. 21, 2011 [retrieved on Sep. 19, 2019]. Retrieved from the Internet URL: http://www.advbiomaterials.com/pdf/HydroThane%20Factsheet.pdf.
Hydromed D Series, Advancesource Biomaterials, Apr. 16, 2010 [retrieved on Sep. 20, 2019]. Retrieved from the Internet URL: http://www.advbiomaterials.com/products/hydrophilic/HydroMed.pdf.
International Search Report and Written Opinion for International Application No. PCT/US2019/035157, mailed on Dec. 12, 2019, 18 pages.
International Search Report and Written Opinion for International Application No. PCT/US2019/035153, Nov. 26, 2019, 12 pages.
Examiner Requisition for Canadian Patent Application No. 3,101,513, issued Dec. 29, 2021, (5 pages).
Notice of Reasons for Rejection for Japanese Patent Application No. 2020-567148, issued Aug. 10, 2021, (with English translation), 7 pages.
Office Action in CN Application No. 201980043652.4 dated Mar. 29, 2024 [with English translation], 9 pages.
Office Action in CN Application No. 201980045247.6 dated Jan. 16, 2024 [with English translation], 10 pages.
Notice of Reasons for Rejection for Japanese Patent Application No. 2020-570732, mailed Jan. 5, 2022, (with English translation), 4 pages.
Examiner Requisition for Canadian Patent Application No., 3, 105,011, issued Nov. 19, 2021, 4 pages.
International Preliminary Report on Patentability in Application No. PCT/US2019/035155 dated Sep. 28, 2021, 11 pages.
Notice of Reasons for Rejection for Japanese Patent Application No. 2020-570732, mailed Sep. 7, 2021, (with English translation), 7 pages.
International Search Report and Written Opinion for International Application No. PCT/US2019/035152, mailed on Nov. 8, 2019, 12 pages.
International Search Report and Written Opinion for International Application No. PCT/US2019/035155, mailed on Nov. 14, 2019, 12 pages.
International Search Report and Written Opinion for International Application No. PCT/US2019/035156, mailed on Sep. 20, 2019, 12 pages.
Decision to grant received for European Patent Application No. 19734962.4, mailed on Jan. 18, 2024, 2 pages.
Decision to Grant received for Japanese Patent Application No. 2020-567148, mailed on May 23, 2022, 5 pages (2 pages of English Translation and 3 pages of Original Document).
Intention to grant received for European Patent Application No. 19734962.4, mailed on Jun. 12, 2023, 9 pages.
International Preliminary Report on Patentability received for PCT Patent Application No. PCT/US19/35153, mailed on Sep. 28, 2021, 6 pages.

(56) References Cited

OTHER PUBLICATIONS

International Preliminary Report on Patentability received for PCT Patent Application No. PCT/US19/35156, mailed on Sep. 28, 2021, 7 pages.
International Preliminary Report on Patentability received for PCT Patent Application No. PCT/US19/35157, mailed on Sep. 28, 2021, 12 pages.
Monosik et al., "Application of Electrochemical Biosensors in Clinical Diagnosis", Journal of clinical laboratory analysis, vol. 26, No. 1, May 15, 2014, pp. 22-34.
Notice of Allowance received for Korean Patent Application No. 10-2020-7037324, mailed on Aug. 23, 2023, 6 pages (2 pages of English Translation and 4 pages of Original Document).
Office Action Issued in Korea Patent Application No. 10-2020-7037741, Mailed Date Jul. 25, 2024, 7 Pages (4 pages of English Translation and 3 pages of Original Document).
Office Action received for Japanese Patent Application No. 2020-567148, mailed on Apr. 28, 2022, 4 pages (2 pages of English Translation and 2 pages of Original Document).
Office Action received for Korean Patent Application No. 10-2020-7037324, mailed on Mar. 29, 2023, 4 pages (2 pages of English Translation and 2 pages of Original Document).
Office Action received for Korean Patent Application No. 10-2020-7037324, mailed on Sep. 27, 2022, 15 pages (8 pages of English Translation and 7 pages of Original Document).
Russo et al., "Charge accumulation in electron cryomicroscopy", Ultramicroscopy, Microelectron Eng, vol. 187, 2018, pp. 43-49.
Notice of Acceptance received for Australian Patent Application No. 2019439465, mailed on Dec. 18, 2024, 3 pages.
Office Action dated Mar. 25, 2025 for KR Application No. 10-2020-7037741 (13 pgs).
Office Action received for Korean Patent Application No. 10-2020-7037741, mailed on Mar. 25, 2025, 15 pages (8 pages of English Translation and 7 pages of Original Office Action).

* cited by examiner

COMPOSITIONS AND METHODS FOR IMPROVED CALIBRATION ACCURACY OF CREATININE/CREATINE SENSORS AND USES THEREOF

CROSS-REFERENCE TO RELATED APPLICATIONS

This application claims the benefit of priority of U.S. Provisional Application No. 62/830,191, filed on Apr. 5, 2019, the entire contents of which are hereby incorporated by reference in their entirety.

FIELD OF THE DISCLOSURE

The disclosure relates to electrochemical sensors for measuring creatinine and creatine in a sample. More particularly, the disclosure relates to compositions and methods for improving calibration accuracy of electrochemical sensors used for measuring creatinine and creatine (e.g., in a subject's blood).

BACKGROUND OF THE DISCLOSURE

The ability to accurately measure creatinine and creatine levels in a patient's blood is an important indicator of renal (e.g., kidney) health. In particular, serum creatinine is an important indicator of renal health because it is excreted unaltered by the kidneys, and can readily be measured. For example, elevated levels of blood serum creatinine is a late marker of chronic kidney disease, and is generally only observed when significant kidney damage has already occurred. Chronic kidney disease refers to the gradual loss of kidney function. The kidneys function to filter wastes and excess fluids from the blood, and these filtered wastes and excess fluids are then excreted in urine. When chronic kidney disease reaches an advanced stage (e.g., end-stage renal disease), dangerous levels of fluids, metabolites, electrolytes, wastes, and the like, can build up in the body. In the early stages of chronic kidney disease, there may be few signs or symptoms, and progression of the disease may not become apparent until kidney function has been significantly impaired.

Creatinine/creatine in a sample (e.g., a patient's blood) may be measured via electrochemical sensors. For example, current creatinine sensors may include an enzymatic biosensor containing three enzymes—creatininase, creatinase, and sarcosine oxidase—that catalyze the production of glycine, formaldehyde, and hydrogen peroxide from creatinine and water. These three enzymes may be immobilized on the surface of a platinum electrode, and the final reaction product of hydrogen peroxide ($H_2O_2$) may then be electrochemically oxidized on the platinum electrode under a constant polarization potential and used to measure creatinine and/or creatine levels in a patient's blood. However, in order to determine creatinine and/or creatine concentrations in a biological sample, the creatinine and creatine sensors need to be calibrated to determine their sensitivities. This can be done by measuring the current responses of creatinine and creatine sensors in calibration solutions with pre-determined concentrations of creatinine and creatine. Once the sensitivities of the creatinine and creatine sensors are determined, the concentrations of creatinine and creatine in any biological sample can be estimated by measuring the current signals of that sample and comparing the measured sensitivities of the creatinine and creatine sensors as determined from the calibration process. Unfortunately, it is non-trivial to maintain stable creatinine and creatine concentrations in the sensor calibration solutions because the hydrolysis of creatinine to creatine is a reversible reaction in aqueous solution. Such hydrolysis of creatinine to creatine, or vice versa, is accelerated by increased storage temperature and/or age of the calibration solutions. Therefore, an error in creatinine and creatine concentration values associated with the calibration solutions will lead directly to an error in the calibration results—the sensor sensitivities, which in turn will propagate the error to all the sample results measured using these sensitivities. Accordingly, there is an urgent unmet need to identify and develop new methodologies to improve biosensor calibration accuracy for creatinine and/or creatine measurement.

SUMMARY OF THE DISCLOSURE

The present disclosure provides electrochemical sensors for measuring creatinine and creatine in a sample. More particularly, the present disclosure provides compositions and methods for improving calibration accuracy of electrochemical sensors used for measuring creatinine and creatine (e.g., in a subject's blood).

In an aspect, the present disclosure provides a method of calibrating a creatinine/creatine measuring system having a creatine sensor and a creatinine sensor that includes the steps of: measuring, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor; measuring, with the creatine sensor, a measured creatine concentration (MCR_CS3) of a second calibration solution (CS3) having an initial known creatine concentration (CR_CS3), an initial known creatinine concentration (CREA_CS3) and an unstable ratio of creatine to creatinine; comparing MCR_CS3 of CS3 to CR_CS3 to establish a creatine and creatinine concentration correction value for CS3 based on equal molar conversion; measuring, with the creatinine sensor, a creatinine sensor current signal ($\Delta I2'$) of CS2 and a creatinine sensor current signal ($\Delta I3'$) of CS3 creatinine concentrations (CREA_CS2), measured creatinine concentration (MCREA_CS3), and creatine concentrations (CR_CS2) and (MCR_CS3); determining a first creatinine sensor sensitivity (Slope1); determining a second creatinine sensor sensitivity (Slope2); and estimating a creatinine concentration in a sample based on the current signal of the sample and the Slope1 and Slope2.

In an embodiment, Slope=$\Delta I2$/CR_CS2.

In an embodiment, Slope1=(MCR_CS3*$\Delta I2'$−CR_CS2*$\Delta I3'$)/(CREA_CS2*MCR_CS3−MCREA_CS3*CR_CS2).

In an embodiment, Slope2=(CREA_CS2*$\Delta I3'$−MCREA_CS3*$\Delta I2'$)/(CREA_CS2*MCR_CS3−MCREA_CS3*CR_CS2).

In an embodiment, the stable ratio of creatine to creatinine is about 1.5 to about 2.

In an embodiment, CS2 includes about 2-5 mg/dL of creatine and about 1-3 mg/dL of creatinine.

In an embodiment, the ratio of creatine to creatinine in CS2 is 1.5 to 2.

In an embodiment, the ratio of creatine to creatinine in CS2 is stable for a minimum of 8 months.

In an embodiment, CS3 includes between about 2 and about 8 mg/dL of creatine and between about 0 and about 1 mg/dL of creatinine.

In an embodiment, the ratio of creatine to creatinine in CS3 is about 4 to about 70.

In an embodiment, the creatine concentration correction value is used to correct CREA_CS3 based on equal molar creatine to creatinine conversion.

In an aspect, the present disclosure provides a method of calibrating a creatinine/creatine measuring system having a creatine sensor and a creatinine sensor, including the steps of: measuring, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor; measuring, with the creatinine sensor, a creatinine sensor current signal ($\Delta I2'$) of CS2 and a creatinine sensor current signal ($\Delta I3'$) of a second calibration solution (CS3) having an initial known creatine concentration (CR_CS3), an initial known creatinine concentration (CREA_CS3), and an unstable ratio of creatine to creatinine; determining a first creatinine sensor sensitivity (Slope1); determining a second creatinine sensor sensitivity (Slope2); measuring, with the creatine sensor, a creatine concentration of a first correction solution (COR1) having a known creatine concentration (CR_COR1), a known creatinine concentration (CREA_COR1), and a stable ratio of creatine to creatinine; measuring, with the creatinine sensor, a creatinine concentration of COR1 (CREA_COR1); comparing the measured creatinine concentration to CR_COR1 and the measured creatinine concentration to CREA_COR1 to establish a creatine concentration correction value and a creatinine concentration correction value; and estimating, based on the values of Slope, Slope1, Slope2, and creatine and creatinine current signals a creatinine concentration in a sample.

In an embodiment, Slope=$\Delta I2$/CR_CS2.

In an embodiment, Slope1=(CR_CS3*$\Delta I2'$-CR_CS2*$\Delta I3'$)/(CREA_CS2*CR_CS3-CREA_CS3*CR_CS2).

In an embodiment, Slope2=(CREA_CS2*$\Delta I3'$-CREA_CS3*$\Delta I2'$)/(CREA_CS2*CR_CS3-CREA_CS3*CR_CS2).

In an embodiment, the stable ratio of creatine to creatinine is about 1.5 to about 2.

In an embodiment, CS2 includes about 2-5 mg/dL of creatine and about 1-3 mg/dL of creatinine.

In an embodiment, the ratio of creatine to creatinine in CS2 is 1.5 to 2.

In an embodiment, the ratio of creatine to creatinine in the CS2 is stable for a minimum of 8 months.

In an embodiment, CS3 includes between about 2 and about 8 mg/dL of creatine and between about 0 and about 1 mg/dL of creatinine.

In an embodiment, the ratio of creatine to creatinine in the solution is about 4 to about 70.

In an embodiment, COR1 comprises a concentration of creatine between about 0 and about 2 mg/dL and a concentration of creatinine between about 1 and about 3 mg/dL.

In an embodiment, the method further includes the steps of: measuring, with the creatine sensor, a creatine concentration of a second correction solution (COR2) having a known creatine concentration (CR_COR2) and a known creatinine concentration (CREA_COR2) and a stable ratio of creatine to creatinine; and measuring, with the creatinine sensor, a creatinine concentration of COR2 (CREA_COR2)

In an embodiment, Slope1=(CR_CS3*$\Delta I2'$-CR_CS2*$\Delta I3'$)/(CREA_CS2*CR_CS3-CREA_CS3*CR_CS2).

In an embodiment, Slope2=(CREA_CS2*$\Delta I3'$-CREA_CS3*$\Delta I2'$)/(CREA_CS2*CR_CS3-CREA_CS3*CR_CS2).

In an embodiment, the creatine to creatinine ratio of CS2 is different from CS3.

In an embodiment, the concentrations of creatine and creatinine in the first or second correction solution are maintained at 95% or better stability.

In an embodiment, the concentrations of creatine and creatinine in the first or second correction solution are maintained by refrigeration.

In an embodiment, the correction factors from the first or second correction solutions are used to adjust the slopes of creatinine or creatine sensors.

In an embodiment, the creatine concentration correction value and the creatinine concentration correction value are used to adjust the sample results as bias or % correlation.

In an embodiment, the method further includes at least one additional correction solution.

In an aspect, the present disclosure provides a creatinine/creatine measuring system, that includes: a creatine sensor; a creatinine sensor; one or more network interfaces to communicate in a computer network; a processor coupled to the network interfaces and the creatine sensor and the creatinine sensor and adapted to execute one or more processes; and a memory configured to store a process executable by the processor, the process when executed operable to:

measure, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor; measure, with the creatine sensor, a measured creatine concentration (MCR_CS3) of a second calibration solution (CS3) having an initial known creatine concentration (CR_CS3), an initial known creatinine concentration (CREA_CS3) and an unstable ratio of creatine to creatinine; compare MCR_CS3 of CS3 to CR_CS3 to establish a creatine concentration correction value for CS3; measure, with the creatinine sensor, a creatinine sensor current signal ($\Delta I2'$) of CS2 and a creatinine sensor current signal ($\Delta I3'$) of CS3 creatinine concentrations (CREA_CS2), measured creatinine concentration (MCREA_CS3), and creatine concentrations (CR_CS2) and (MCR_CS3); determine a first creatinine sensor sensitivity (Slope1); determine a second creatinine sensor sensitivity (Slope2); and estimate a creatinine concentration in a sample based on the current signal of the sample and the Slope1 and Slope2.

In an aspect, the present disclosure provides a creatinine/creatine measuring system, that includes: a creatine sensor; a creatinine sensor; one or more network interfaces to communicate in a computer network; a processor coupled to the network interfaces and the creatine sensor and the creatinine sensor and adapted to execute one or more processes; and a memory configured to store a process executable by the processor, the process when executed operable to:

measure, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor; measure, with the creatinine sensor, a creatinine sensor current signal ($\Delta I2'$) of CS2 and a creatinine sensor current signal ($\Delta I3'$) of a second calibration solution (CS3) having an initial known creatine concentration (CR_CS3), an initial known creatinine concentration (CREA_CS3), and an unstable ratio of creatine to creatinine; determining a first creatinine sensor sensitivity (Slope1); determining a second creatinine sensor sensitivity (Slope2); measure, with the creatine sensor, a creatine concentration of a first correction solution (COR1) having a known creatine concentration (CR_COR1), a known creatinine concentration (CREA_COR1), and a stable ratio of creatine to creatinine; measuring, with the creatinine sensor, a creatinine concentration of COR1 (CREA_COR1); comparing the measured creatine concentration to CR_COR1 and the measured creatinine concentration to CREA_COR1 to establish a creatine concentration correction value and a creatinine concentration correction value; and estimating, based on the values of Slope, Slope1, Slope2, and creatine and creatinine current signals a creatinine concentration in a sample.

By "control" or "reference" is meant a standard of comparison. In one aspect, as used herein, "changed as compared to a control" sample or subject is understood as having a level that is statistically different than a sample from a normal, untreated, or control sample. Control samples include, for example, creatine solutions, creatinine solutions, and the like. Methods to select and test control samples are within the ability of those in the art. Determination of statistical significance is within the ability of those skilled in the art, e.g., the number of standard deviations from the mean that constitute a positive result.

As used herein, "creatine (a.k.a., 2-[Carbamimidoyl (methyl)amino]acetic acid, N-Carbamimidoyl-N-methyl-glycine, or Methylguanidoacetic acid)" refers to an organic compound that produce energy for the cells through the recycling of adenosine triphosphate (ATP) by converting adenosine diphosphate (ADP) back to ATP by donating phosphate groups. Creatine has the following chemical structure:

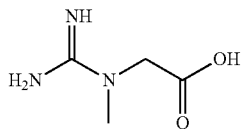

2-[Carbamimidoyl(methyl)amino]acetic acid

As used herein, "creatinine" refers to the enzymatic breakdown by-product of creatine, and is generally found in two major tautomeric forms, which are shown below.

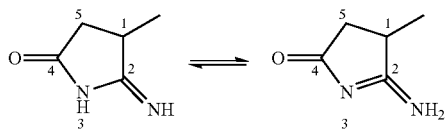

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it is understood that the particular value forms another aspect. It is further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. It is also understood that throughout the application, data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed. Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Other features and advantages of the disclosure will be apparent from the following description of the preferred embodiments thereof, and from the claims. Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All published foreign patents and patent applications cited herein are incorporated herein by reference. All other published references, documents, manuscripts and scientific literature cited herein are incorporated herein by reference. In addition, the materials, methods, and examples are illustrative only and not intended to be limiting.

Where applicable or not specifically disclaimed, any one of the embodiments described herein are contemplated to be able to combine with any other one or more embodiments, even though the embodiments are described under different aspects of the disclosure.

These and other embodiments are disclosed and/or encompassed by, the following Detailed Description.

BRIEF DESCRIPTION OF THE DRAWINGS

The following detailed description, given by way of example, but not intended to limit the disclosure solely to the specific embodiments described, may best be understood in conjunction with the accompanying drawings, in which:

FIG. 1A shows creatinine measurement without real time creatine correction, while FIG. 1B shows creatinine measurement in which creatine and creatinine were corrected based on real time measurement of creatine by a creatine sensor according to an exemplary embodiment of the disclosure. The dashed lines provided acceptable bias limits when comparing the test results from whole blood cartridge creatinine values vs. the plasma reference values (e.g., Total Allowable Error, TEa).

FIG. 2A shows creatinine results without on-board measured creatine and two correction solutions. FIG. 2B shows creatinine results from the same samples but with on-board measured creatine and two correction solutions according to an exemplary embodiment of the disclosure.

DETAILED DESCRIPTION OF THE DISCLOSURE

Figure 1A:
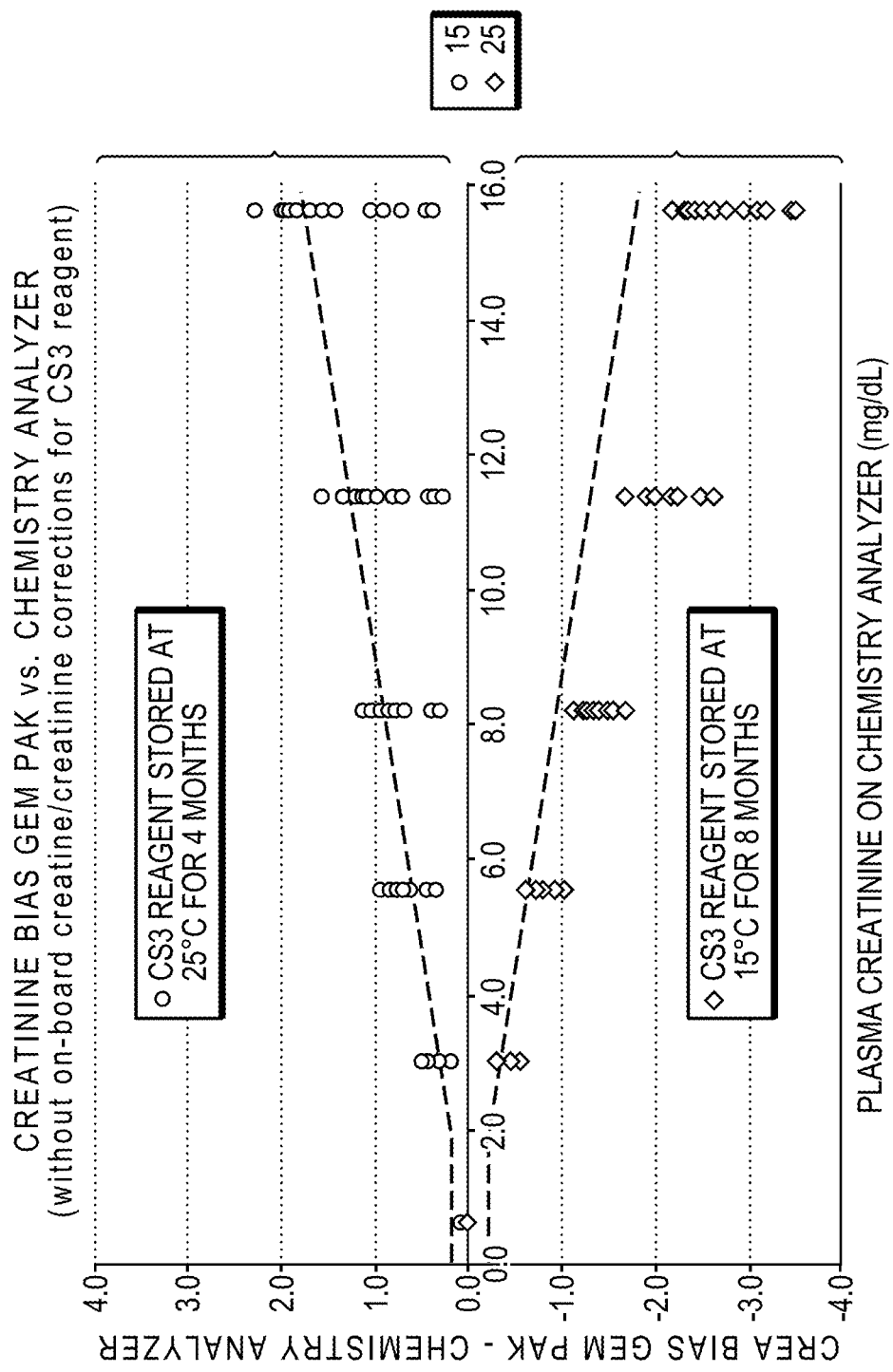
FIGS. 1A-1B show two graphs that depict the bias of creatinine measured by whole blood creatinine biosensor vs. plasma creatinine on a chemistry analyzer in two study groups using cartridges with the same CS3 reagents that were subjected to different storage conditions: data points in green circles were cartridges with CS3 reagent stored 4 months at 25° C., while data points in blue diamonds were cartridges with CS3 reagent stored 8 months at 15° C.

The present disclosure is based, at least in part, on the discovery that a 3-point calibration process may be used to accurately calibrate creatinine sensors in a creatine and creatinine biosensor system that may be implemented at room temperature. Advantageously, the present disclosure provides compositions and methods that enable accurate creatine/creatinine sensor calibration using either internal calibration solutions or external correction solutions, which in turn allow for accurate detection of creatine and/or creatine in biological or laboratory samples.

Overview

Current creatinine sensors in a creatine/creatinine system (e.g., GEM PAK cartridge) include an enzymatic biosensor containing three enzymes. These enzymes are immobilized on the surface of a platinum electrode. The creatinine detection system is based on the following three enzyme cascade reaction (Rx):

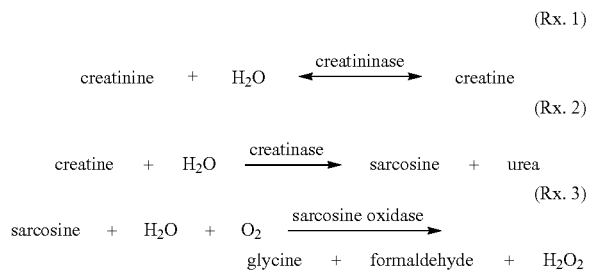

The product hydrogen peroxide ($H_2O_2$) is then electrochemically oxidized on the platinum electrode under the constant polarization potential, and the current signal is proportional to the analyte concentration.

The presence of creatine in clinical samples necessitates an additional sensor for creatine measurement to correct for the creatine response of the creatinine sensor. The creatine sensor includes only reactions (2) and (3) of the above enzyme cascade reactions.

Both the creatine and creatinine sensors have a diffusion control membrane (also referred to as an outer membrane) on top of the enzyme layers. The diffusion control membrane limits the flux of creatinine and creatine substrates entering the enzyme layer to ensure that the signals generated by the hydrogen peroxide are proportional to the substrate concentrations of the sample.

In order to determine the respective concentrations of creatinine and creatine in a biological sample(s), the creatinine and creatine sensors need to be calibrated in order to determine their respective sensitivities. This may be achieved by comparing the readings of the creatinine and creatine sensors in calibration solutions containing predetermined (e.g., known) concentrations of creatinine and creatine. Once the sensitivities of the creatinine and creatine sensors are determined, the concentrations of creatine and creatinine in any biological sample can be estimated by adjusting the measured readings with the results determined from the calibration process.

Theoretically, a creatinine measurement system as described above may quantitatively measure the concentration of creatinine in biological samples. However, there are several practical issues associated with the reagent stability that present challenges with respect to measuring creatinine accurately. For example, as shown in the diagram below, the hydrolysis of creatinine to creatine is a reversible process in aqueous solution that may vary in a manner that depends on the temperature and solution media, until an optimal stable ratio of creatine/creatinine is reached (e.g., about 1.5 to 2). When the creatine/creatinine ratio is above or below the optimal range, the creatine will convert to creatinine or vice versa. Consequently, the concentrations of creatinine and creatine in calibration solutions will change over time during storage from the original factory assigned concentrations, as shown in Rx. 4.

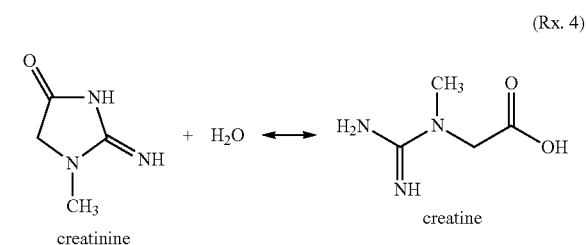

(Rx. 4)

Disadvantageously, that makes it difficult to accurately calibrate creatinine sensors.

Additionally, the conversion between creatinine and creatine during storage conditions will shift the creatine/creatinine ratio until the optimal stable ratio is reached. Unfortunately, this will introduce calibration errors into the sensor measurement, and these errors will become more significant over time as the calibration solution ages. This has the consequence of limiting the shelf-life of the reagents and the overall assay performance. One prior art solution to this problem addressed the conversion of creatinine to creatine in the calibration solution during storage by experimentally determining a shelf life decay curve (e.g., equation $[CR\_CS] = [CR\_CS]_0 - *age - b*age\char`^2$, where $[CR\_CS]_0$ is the initial manufacture assigned creatine concentration value for the calibration solution, constant a and b were determined experimentally, age is the shelf life of the calibration solution) for known storage temperatures. By using this decay curve, a real time correction could be correlated with the factory assigned creatinine/creatine concentrations based on the length of storage. The limitation to this approach is that the decay curve based correction assumes that the calibration solutions are exposed to a constant temperature over time. Unfortunately, this assumption is not accurate as the calibration solutions/reagents may be exposed to temperatures that can fluctuate, sometimes dramatically, over time (e.g., during transfer between facilities). Under these circumstances an error can be introduced into the sensor calibration if the decay curve that is used is based on a calibration solution that was subjected to significant temperature fluctuations that can impact the ability of the creatinine sensors to accurately report creatinine concentration in calibration solutions/reagents (e.g., creatine/creatinine solutions) stored, for example, for 8 months or longer.

Other prior art methods to minimize the creatinine/creatine conversion include refrigerating the reagents (e.g., creatine/creatinine powder or solution), limiting the shelf life of the calibration solution to couple weeks, and/or preparing reagent/calibration solutions on site at a customer's facility immediately prior to use by mixing the creatinine and creatine powder into solution. Unfortunately, all of these prior art methods are impractical for point-of-care use at clinical testing locations.

The techniques herein solve the above-enumerated prior art problems with creatine/creatinine calibration solution instability (e.g., creatine/creatinine conversion in calibration solutions during storage) by minimizing the variation in measured biological creatinine levels. As described further below, the following steps may be implemented to address the impact of calibration error due to changes in the creatine/creatinine ratio in calibration solutions during shipping and/or storage:
1. Install and calibrate the creatine sensor.
2. Measure creatine concentration of the second calibration solution (e.g., CS3) that is not used for creatine sensor calibration and additional correction solutions to assess the change in concentration of the second calibration solution during shipping and storage.
3. Use changes in creatine concentration relative to the factory assigned values, in molar equivalent concentration, to correct for changes in creatinine concentration change during storage since creatine is assumed to convert into creatinine or vice versa.
4. Apply the creatine and creatinine corrections to the second calibration reagent for creatinine prior to completing the creatinine sensor calibration process and continue to use this same correction over the lifetime of the sensor.

The techniques herein provide systems for calibrating creatine and/or creatinine biosensors.

Calibration systems for a creatine sensor or biosensor may involve a 2-point calibration based on the following equation:

$$\Delta I2 = [CR\_CS2]*Slope \qquad (Eq. 1)$$

$\Delta I2$ is a current signal measured on the creatine sensor in a first calibration solution (CS2). $[CR\_CS2]$ is the concentration of creatine in the first calibration solution (CS2). As discussed in detail below, CS2 may have a known concentration of creatine (CR_CS2), a known concentration of creatinine (CREA_CS2), and a stable ratio of creatine to creatinine, which makes it possible to establish a creatine sensor sensitivity (Slope) for the creatine sensor.

According to the techniques herein, a calibration system for a creatinine sensor or biosensor may implement a 3-point calibration methodology. As the creatinine sensor provides readings of both creatinine and creatine in biological samples or calibration solutions containing both analytes, the sensitivities of the creatinine sensor to creatinine (Slope1) or creatine (Slope2) may be determined according to the disclosure, as defined below, from equations 2-5 below. The disclosure provides that two calibration solutions with distinct ratios of creatine/creatinine may be used for the 3-point calibration method.

3-point creatinine sensor calibration equations:

$$\Delta I2' = [CREA\_CS2]*Slope1 + [CR\_CS2]*Slope2 \qquad (Eq. 2)$$

$$\Delta I3' = [CREA\_CS3]*Slope1 + [CR\_CS3]*Slope2 \qquad (Eq. 3)$$

$\Delta I2'$ and $\Delta I3'$ are current signals measured on creatinine sensor in a first calibration solutions (CS2) and a second calibration solution (CS3), respectively. CS3 may have an initial known creatine concentration (CR_CS3), an initial known creatinine concentration (CREA_CS3) and an unstable ratio of creatine to creatinine.

[CREA_CS2], [CREA_CS3], [CR_CS2] and [CR_CS3] represent the initial known concentrations of creatinine and creatine in calibration solutions CS2 and CS3, respectively. The sensitivity of the creatinine sensor for creatinine and creatine, Slope1 (sensor sensitivity to creatinine) and Slope2 (sensor sensitivity to creatine), can be derived from Eq. 2 and 3:

$$Slope1 = ([CREA\_CS3]*\Delta I2' - [CR\_CS2]*\Delta I3')/([Creat\_CS2]*[CR\_CS3] - [Creat\_CS3]*[CR\_CS2])\ pA/mg/dL \qquad (Eq. 4)$$

$$Slope2 = ([CREA\_CS2]*\Delta I3' - [CREA\_CS3]*\Delta I2')/([Creat\_CS2]*[CR\_CS3] - [Creat\_CS3]*[CR\_CS2])pA/mg/dL \qquad (Eq. 5)$$

CS2 may be formulated at the optimal stable ratio of creatine/creatinine between about 1.5 and 2, while CS3 may be formulated at a different, unstable, ratio (about 10 to 70) of creatine/creatinine that will vary over time from the original ratio at the time of manufacturing due to concentration changes during storage. This change in creatine and creatinine concentrations from the original manufacturing stage, if uncorrected, will introduce calibration errors and therefore sample measurement errors.

According to the disclosure, calibration solutions CS2 and CS3 may be used in "onboard" applications (e.g., within a biosensor apparatus or cartridge).

As described herein, the present disclosure also provides correction solutions designed to be stable at the factory assigned creatinine and creatine concentrations through appropriate creatine/creatinine ratios or through optimal storage conditions. Such correction solutions may be used in "external" applications such as, for example, during the initial calibration of a creatinine and/or creatine sensor system. Upon measuring these correction solutions with an individual creatinine sensor and/or creatine sensor, the deviation from measured creatinine and creatine concentrations may be identified by comparison to the factory assigned creatinine and creatine concentrations, and then used as the correction factor for all subsequent biological samples. The correction factors may be used to minimize the impact of any residual errors in creatinine and creatine value assignments for a specific cartridge(s) and may be used continuously throughout the life of the sensor.

The new creatinine/creatine sensor calibration system described herein may include the steps of 1) correcting the creatine/creatinine concentrations of the calibration solution that may not have a stable creatinine/creatine ratio, 2) calibrating the sensor, 3) establishing correction factors, and 4) taking sample measurements. These steps are described in detail below:

1. Establishing that the creatinine and creatine concentrations of the calibration solution are not at an optimal creatine/creatinine ratio. In this exemplary creatinine/creatine sensor calibration system, there are three calibration solutions: calibration solution 1 (CS1), calibration solution 2 (CS2), and calibration solution 3 (CS3). CS1 does not contain either creatinine or creatine, and is used for baseline measurements (e.g., a blank control). CS2 and CS3 both contain creatinine and creatine concentrations at different ratios. CS2 has a creatine/creatinine ratio of about 1.5 to 2 that is stable and can maintain the factory assigned creatinine and creatine concentrations throughout the shelf life for a minimum of 8 months without significant changes. In contrast to CS2, CS3 has a different creatine/creatinine ratio that is unstable and will change over time in storage (e.g., by converting creatine to creatinine slowly during storage of the solution). When creatinine and creatine sensors are installed and exposed to calibration solutions that have aged over the shelf life of the solution(s), but within the specified solution storage temperature conditions (15° C.-25° C.), the creatine sensor sensitivity can be determined accurately by measuring the current in CS2 and applying the factory assigned creatine concentration of CS2. Then the creatine concentration in CS3 and/or the external correction solutions is measured with the measured current on the creatine sensor and the creatine sensitivity. The concentration of creatine that has been converted to creatinine in CS3 can be derived from the difference between the factory assigned creatine concentration value and the measured creatine concentration value in CS3. The creatinine increase in CS3 can then be estimated by applying molar equivalent concentration of the change in CS3 creatine concentration as a correction to the factory assigned creatinine concentrations. Therefore, the creatinine and creatine concentrations in CS3 are both determined in real time at the beginning of the sensor installation during the initial sensor calibration without the need to apply a decay curve (e.g., with the aid of an equation).

2. Sensor calibration. Each creatinine measuring system contains both creatinine and creatine sensors, and the sensors are calibrated periodically using the calibration solutions throughout the lifetime of the sensor. The sensitivities of the creatinine and creatine sensors may be calculated as described in previous background section. These sensitivities may then be used for subsequent sample measurement.

The sensitivity of the creatine sensor is determined by measuring the current in the CS2 solution and factory assigned CS2 creatine concentration, as shown in Eq. 1 above.

The creatinine sensitivities (to creatinine-Slope1 and creatine-Slope2 as defined in equations 3 and 4) are determined by measuring the currents in CS2 and CS3, comparing these measurements to the factory assigned concentrations of creatinine and creatine in CS2, and applying real time corrections to the factory assigned creatinine and creatine concentrations in CS3 at the time of the sensor installation and initial calibration as shown in Eqs. 2-5 above.

3. Additionally, external corrections may be implemented using one or more correction solutions. For example, two correction solutions (e.g., a first correction solution (COR1) and a second correction solution (COR2) with stable creatine/creatinine concentrations) may be used to correct any residual errors from the calibration accuracy. These solutions have predetermined creatinine and creatine concentrations that are stable (e.g., COR1 may have a concentration range of about 0-2 and 1-3 mg/dL for creatinine and creatine, respectively, while COR2 may have concentration range of about 0-1 and 2-8 mg/dL for creatinine and creatine, respectively). For example, these solutions may be sealed in reagent bags or in ampules and are designed to maintain constant $pCO_2$, pH levels, and creatinine/creatine levels. These solutions may be buffered and/or contain biocides to ensure stability. It is important that the creatinine and creatine concentrations of both of these solutions be kept stable during their usage. This may be accomplished in a variety of ways known to the skilled artisan. For example, the external correction solutions may be sealed into ampoules to maintain the reproducibility for use when correcting sensors from cartridge to cartridge. In yet another example, the correction solutions may be refrigerated and/or also packaged in ampules.

The creatinine/creatine correction solution may be measured on each creatinine measuring system at the beginning of its use once the sensor calibration is completed and the sensitivities are established. The creatinine and creatine concentrations measured by the sensors are compared to the factory assigned creatinine and creatine levels, and used to establish the correction factors for the creatinine sensor and creatine sensor, respectively.

Alternatively, two correction solutions can be measured consecutively at the beginning of the usage lifetime and the correction factors can be established more accurately from two distinct levels of creatinine and creatine concentrations. These correction factors provide the correction for residual errors from calibration process including shelf life decay for that specific cartridge.

Since these correction solutions have accurately predetermined creatinine and creatine concentrations, and they are kept stable and outside of the creatinine measuring system, they can be used as independent checks of the calibration accuracy of the creatinine measuring system. Thus tolerance ranges are established to accept or reject the creatinine measuring system based on the reported results of the creatinine and creatine of that cartridge from the correction solutions.

4. Measuring creatinine/creatine in biological samples. For each patient sample, the current signals are measured on creatinine and creatine sensors. Following the direct current reading, the sensitivities from the most recent calibration are used to estimate the creatinine and creatine concentrations. Finally, the correction factors may be applied to obtain the final creatinine and creatine results.

In an alternative embodiment, the correction may be applied to the sensitivities obtained from the calibration process when two correction solutions are used. In this approach, the correction factors to the sensitivity obtained from two correction solutions from the initial calibration may be directly applied to the sensitivities from the most recent sensor calibration. Then the sample creatinine and creatine concentrations are estimated from sample readings and the corrected sensitivities.

Figure 5:
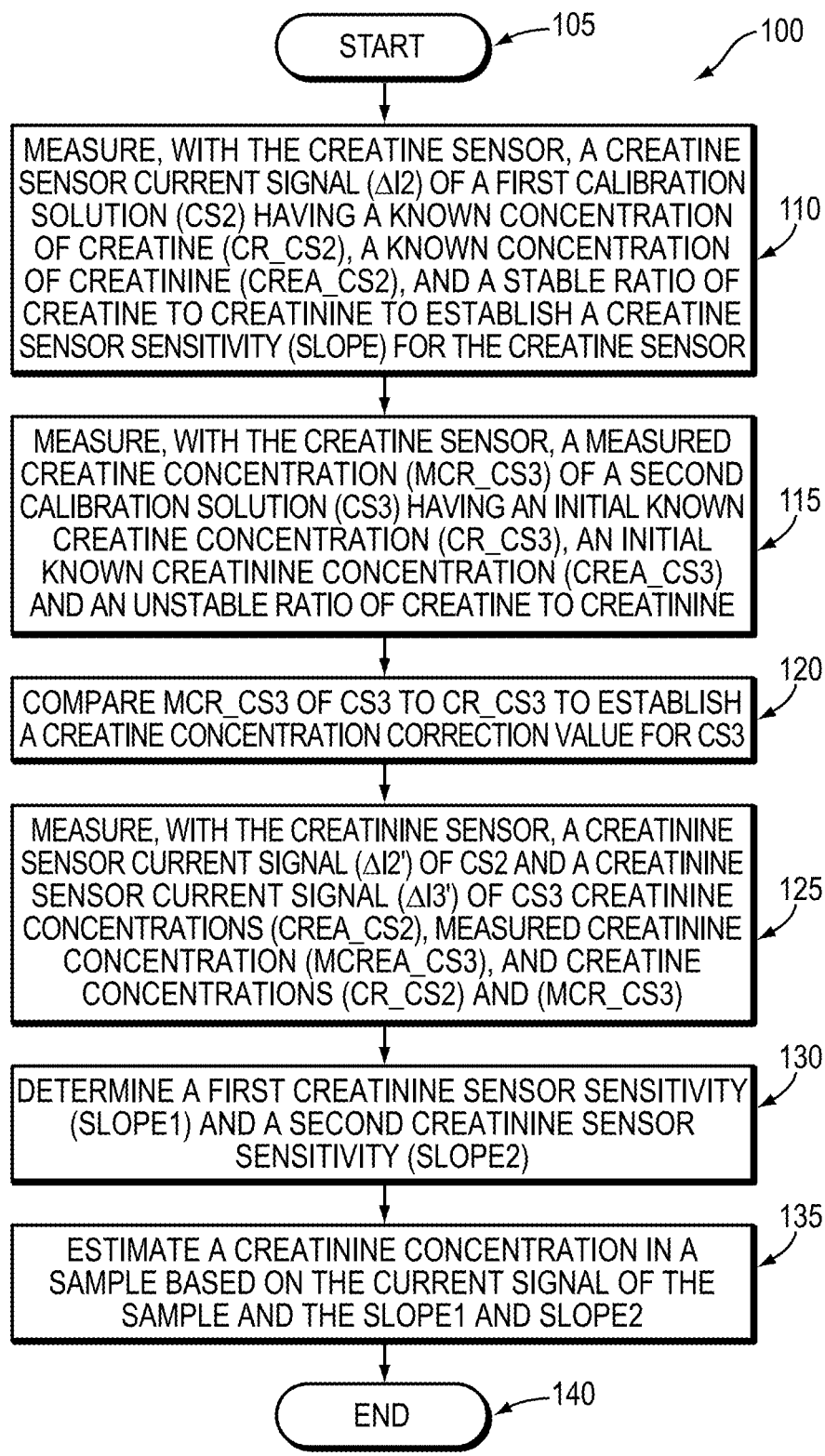
FIG. 5 illustrates a simplified procedure for onboard calibration of creatine and creatinine sensors according to an exemplary embodiment of the disclosure.

FIG. 5 illustrates an example of a simplified procedure for onboard calibration of creatine and creatinine sensors according to an exemplary embodiment of the disclosure.

For example, a non-generic, specifically configured device (e.g., a GEM Premier Analyzer) may perform procedure 100 by executing, for example, stored instructions. The procedure 100 may start at step 105 and continue to step 110 where, as described in greater detail above, a device having a creatine sensor, a creatinine sensor, one or more network interfaces to communicate in a computer network, a processor coupled to the network interfaces and the creatine sensor and the creatinine sensor and adapted to execute one or more processes; and a memory configured to store a process executable by the processor and provide for onboard calibration of creatine and creatinine sensors.

In step 110, the device measures, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor.

In step 115, the device measures, with the creatine sensor, a measured creatine concentration (MCR_CS3) of a second calibration solution (CS3) having an initial known creatine concentration (CR_CS3), an initial known creatinine concentration (CREA_CS3) and an unstable ratio of creatine to creatinine.

The simplified procedure may then proceed to step 120, were the device compares MCR_CS3 of CS3 to CR_CS3 to establish a creatine and creatinine concentration correction value for CS3 based on equal molar conversion.

In step 125, the device measures, with the creatinine sensor, a creatinine sensor current signal ($\Delta I2'$) of CS2 and a creatinine sensor current signal ($\Delta I3'$) of CS3 creatinine concentrations (CREA_CS2), (MCREA_CS3), and creatine concentrations (CR_CS2) and (MCR_CS3). In step 130, the device determines a first creatinine sensor sensitivity (Slope1) and a second creatinine sensor sensitivity (Slope2).

In step 135; the device then estimates a creatinine concentration in a sample based on the current signal of the sample and the Slope1 and Slope2. Procedure 100 then ends at step 140.

Figure 6:
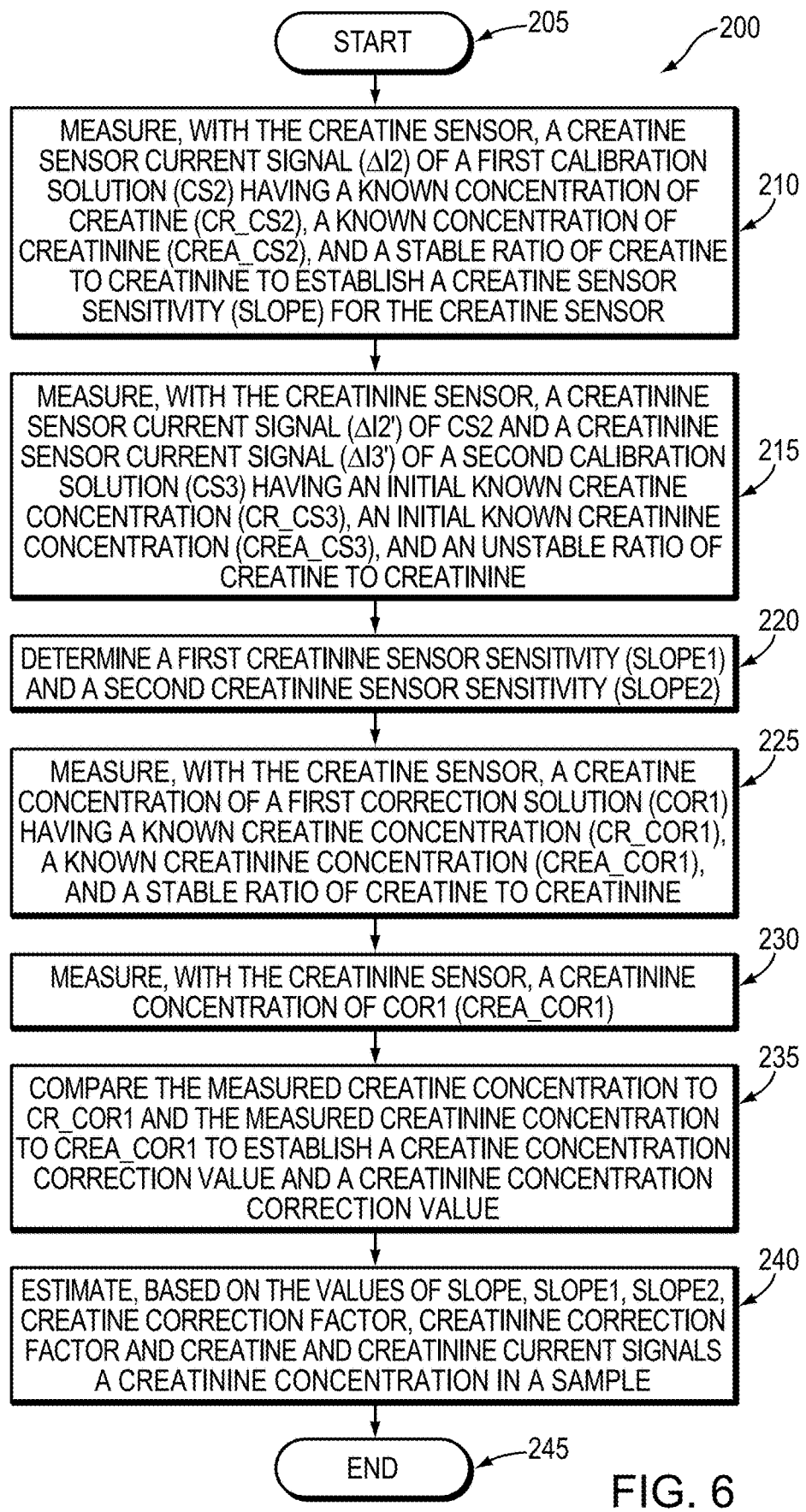
FIG. 6 illustrates a simplified procedure for external calibration of creatine and creatinine sensors according to an exemplary embodiment of the disclosure.

FIG. 6 illustrates a simplified procedure for external calibration of creatine and creatinine sensors according to an exemplary embodiment of the disclosure. For example, a non-generic, specifically configured device (e.g., a GEM Premier Analyzer) may perform procedure 200 by executing, for example, stored instructions. The procedure 200 may start at step 205 and continue to step 210 where, as described in greater detail above, a device having a creatine sensor, a creatinine sensor, one or more network interfaces to communicate in a computer network, a processor coupled to the network interfaces and the creatine sensor and the creatinine sensor and adapted to execute one or more processes; and a memory configured to store a process executable by the processor and provide for onboard calibration of creatine and creatinine sensors.

In step 210, the device measures, with the creatine sensor, a creatine sensor current signal ($\Delta I2$) of a first calibration solution (CS2) having a known concentration of creatine (CR_CS2), a known concentration of creatinine (CREA_CS2), and a stable ratio of creatine to creatinine to establish a creatine sensor sensitivity (Slope) for the creatine sensor.

In step 215, the device measures, with the creatinine sensor, a creatinine sensor current signal ($\Delta I2'$) of cs2 and a creatinine sensor current signal ($\Delta I3'$) of a second calibration solution (CS3) having an initial known creatine concentration (CR_CS3), an initial known creatinine concentration (CREA_CS3), and an unstable ratio of creatine to creatinine.

The simplified procedure may then proceed to step 220, where the device determining a first creatinine sensor sensitivity (SLOPE1) and a second creatinine sensor sensitivity (SLOPE2).

In step 225, the device measures, with the creatine sensor, a creatine concentration of a first correction solution (COR1) having a known creatine concentration (CR_COR1), a known creatinine concentration (CREA_COR1), and a stable ratio of creatine to creatinine; measuring, with the creatinine sensor, a creatinine concentration of COR1 (CREA_COR1).

In step 230, the device measures, with the creatinine sensor, a creatinine concentration of COR1 (CREA_COR1).

In step 235; the device then comparing the measured creatine concentration to CR_COR1 and the measured creatinine concentration to CREA_COR1 to establish a creatine concentration correction value and a creatinine concentration correction value.

In step 240, the device estimates, based on the values of SLOPE, SLOPE1, SLOPE2, creatine correction factor, creatinine correction factor and creatine and creatinine current signals a creatinine concentration in a sample. Procedure 200 then ends at step 245.

The present disclosure addresses the issue of creatinine and creatine sensor sensitivity deviation due to shelf life decay of the calibration solutions. As described in the working examples below, the techniques herein have reduced reported bias for creatinine in clinical samples and have allowed cartridge shelf life to be extended to at least 5 months. It is known that creatinine to creatine conversion over shelf life will impact the sensor sensitivities if not addressed properly. The present disclosure is also applicable to creatinine measuring system using calibration solutions that are not at the optimal stable creatine/creatinine ratio.

Kits

The instant disclosure also provides kits containing agents of this disclosure for use in the methods of the present disclosure. Kits of the instant disclosure may include one or more containers comprising an agent (e.g., creatine, creatinine, etc.) of this disclosure and/or may contain agents in one or more solutions (e.g., CS1, CS2, CS3, correction solutions (e.g., COR1 and COR2), etc.) for calibrating a creatine and/or creatinine sensor(s). In some embodiments, the kits further include instructions for use in accordance with the methods of this disclosure. In some embodiments, these instructions comprise a description of how to apply the agents/solutions to a sensor (e.g., a creatine sensor, creatinine sensor, and the like) and how to calculate variables of interest (e.g., $\Delta I2$, $\Delta I2'$, $\Delta I3'$, Slope, Slope1, Slope 2, and the like) according to any of the methods of the disclosure. In some embodiments, the instructions comprise a description of how to install and calibrate a measuring system as disclosed herein.

The instructions generally include information as to reagent/solution concentration, reagent/solution ratio (e.g., creatine/creatinine ratio), shelf life, etc. Instructions supplied in the kits of the instant disclosure are typically written instructions on a label or package insert (e.g., a paper sheet included in the kit), but machine-readable instructions (e.g., instructions carried on a magnetic or optical storage disk) are also acceptable.

The label or package insert indicates that the reagents/solutions may be used to calibrate any of a variety of creatine and/or creatinine sensor(s) for use in a measuring system as described herein. Instructions may be provided for practicing any of the methods described herein, for example, to install and calibrate a measuring system.

The kits of this disclosure are in suitable packaging. Suitable packaging includes, but is not limited to, vials, ampules, bottles, jars, flexible packaging (e.g., sealed Mylar or plastic bags), and the like. Also contemplated are packages for use in combination with a specific device, such as GEM Premier whole blood analyzer family (Instrumentation Laboratory, Bedford, MA). In certain embodiments, at least one active agent in the reagent or solution is creatine and/or creatinine.

Kits may optionally provide additional components such as buffers and interpretive information. Normally, the kit comprises a container and a label or package insert(s) on or associated with the container.

The practice of the present disclosure employs, unless otherwise indicated, conventional techniques of chemistry, molecular biology, microbiology, recombinant DNA, genetics, immunology, cell biology, cell culture and transgenic biology, which are within the skill of the art. See, e.g., Maniatis et al., 1982, Molecular Cloning (Cold Spring Harbor Laboratory Press, Cold Spring Harbor, N.Y.); Sambrook et al., 1989, Molecular Cloning, 2nd Ed. (Cold Spring Harbor Laboratory Press, Cold Spring Harbor, N.Y.); Sambrook and Russell, 2001, Molecular Cloning, 3rd Ed. (Cold Spring Harbor Laboratory Press, Cold Spring Harbor, N.Y.); Ausubel et al., 1992), Current Protocols in Molecular Biology (John Wiley & Sons, including periodic updates); Glover, 1985, DNA Cloning (IRL Press, Oxford); Anand, 1992; Guthrie and Fink, 1991; Harlow and Lane, 1988, Antibodies, (Cold Spring Harbor Laboratory Press, Cold Spring Harbor, N.Y.); Jakoby and Pastan, 1979; Nucleic Acid Hybridization (B. D. Hames & S. J. Higgins eds. 1984); Transcription And Translation (B. D. Hames & S. J. Higgins eds. 1984); Culture Of Animal Cells (R. I. Freshney, Alan R. Liss, Inc., 1987); Immobilized Cells And Enzymes (IRL Press, 1986); B. Perbal, A Practical Guide To Molecular Cloning (1984); the treatise, Methods In Enzymology (Academic Press, Inc., N.Y.); Gene Transfer Vectors For Mammalian Cells (J. H. Miller and M. P. Calos eds., 1987, Cold Spring Harbor Laboratory); Methods In Enzymology, Vols. 154 and 155 (Wu et al. eds.), Immunochemical Methods In Cell And Molecular Biology (Mayer and Walker, eds., Academic Press, London, 1987); Handbook Of Experimental Immunology, Volumes I-IV (D. M. Weir and C. C. Blackwell, eds., 1986); Riott, Essential Immunology, 6th Edition, Blackwell Scientific Publications, Oxford, 1988; Hogan et al., Manipulating the Mouse Embryo, (Cold Spring Harbor Laboratory Press, Cold Spring Harbor, N.Y., 1986); Westerfield, M., The zebrafish book. A guide for the laboratory use of zebrafish (*Danio rerio*), (4th Ed., Univ. of Oregon Press, Eugene, 2000).

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The present disclosure also relates to a computer system involved in carrying out the methods of the disclosure relating to both computations and sequencing.

A computer system (or digital device) may be used to receive, transmit, display and/or store results, analyze the results, and/or produce a report of the results and analysis. A computer system may be understood as a logical apparatus that can read instructions from media (e.g. software) and/or network port (e.g. from the internet), which can optionally be connected to a server having fixed media. A computer system may comprise one or more of a CPU, disk drives, input devices such as keyboard and/or mouse, and a display (e.g. a monitor). Data communication, such as transmission of instructions or reports, can be achieved through a communication medium to a server at a local or a remote location. The communication medium can include any means of transmitting and/or receiving data. For example, the communication medium can be a network connection, a wireless connection, or an internet connection. Such a connection can provide for communication over the World Wide Web. It is envisioned that data relating to the present disclosure can be transmitted over such networks or connections (or any other suitable means for transmitting information, including but not limited to mailing a physical report, such as a print-out) for reception and/or for review by a receiver. The receiver can be but is not limited to an individual, or electronic system (e.g. one or more computers, and/or one or more servers).

In some embodiments, the computer system may comprise one or more processors. Processors may be associated with one or more controllers, calculation units, and/or other units of a computer system, or implanted in firmware as desired. If implemented in software, the routines may be stored in any computer readable memory such as in RAM, ROM, flash memory, a magnetic disk, a laser disk, or other suitable storage medium. Likewise, this software may be delivered to a computing device via any known delivery method including, for example, over a communication channel such as a telephone line, the internet, a wireless connection, etc., or via a transportable medium, such as a computer readable disk, flash drive, etc. The various steps may be implemented as various blocks, operations, tools, modules and techniques which, in turn, may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

A client-server, relational database architecture can be used in embodiments of the disclosure. A client-server architecture is a network architecture in which each computer or process on the network is either a client or a server. Server computers are typically powerful computers dedicated to managing disk drives (file servers), printers (print servers), or network traffic (network servers). Client computers include PCs (personal computers) or workstations on which users run applications, as well as example output devices as disclosed herein. Client computers rely on server computers for resources, such as files, devices, and even processing power. In some embodiments of the disclosure, the server computer handles all of the database functionality. The client computer can have software that handles all the front-end data management and can also receive data input from users.

A machine readable medium which may comprise computer-executable code may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The subject computer-executable code can be executed on any suitable device which may comprise a processor, including a server, a PC, or a mobile device such as a smartphone or tablet. Any controller or computer optionally includes a monitor, which can be a cathode ray tube ("CRT") display, a flat panel display (e.g., active matrix liquid crystal display, liquid crystal display, etc.), or others. Computer circuitry is often placed in a box, which includes numerous integrated circuit chips, such as a microprocessor, memory, interface circuits, and others. The box also optionally includes a hard disk drive, a floppy disk drive, a high capacity removable drive such as a writeable CD-ROM, and other common peripheral elements. Inputting devices such as a keyboard, mouse, or touch-sensitive screen, optionally provide for input from a user. The computer can include appropriate software for receiving user instructions, either in the form of user input into a set of parameter fields, e.g., in a GUI, or in the form of preprogrammed instructions, e.g., preprogrammed for a variety of different specific operations.

Reference will now be made in detail to exemplary embodiments of the disclosure. While the disclosure will be described in conjunction with the exemplary embodiments, it will be understood that it is not intended to limit the disclosure to those embodiments. To the contrary, it is intended to cover alternatives, modifications, and equivalents as may be included within the spirit and scope of the disclosure as defined by the appended claims. Standard techniques well known in the art or the techniques specifically described below were utilized.

EXAMPLES

The present disclosure is further illustrated by the following examples, which should not be construed as limiting. The contents of all references, and published patents and patent applications cited throughout the application are hereby incorporated by reference. Those skilled in the art will recognize that the disclosure may be practiced with variations on the disclosed structures, materials, compositions and methods, and such variations are regarded as within the scope of the disclosure.

Example 1

Figure 1B:
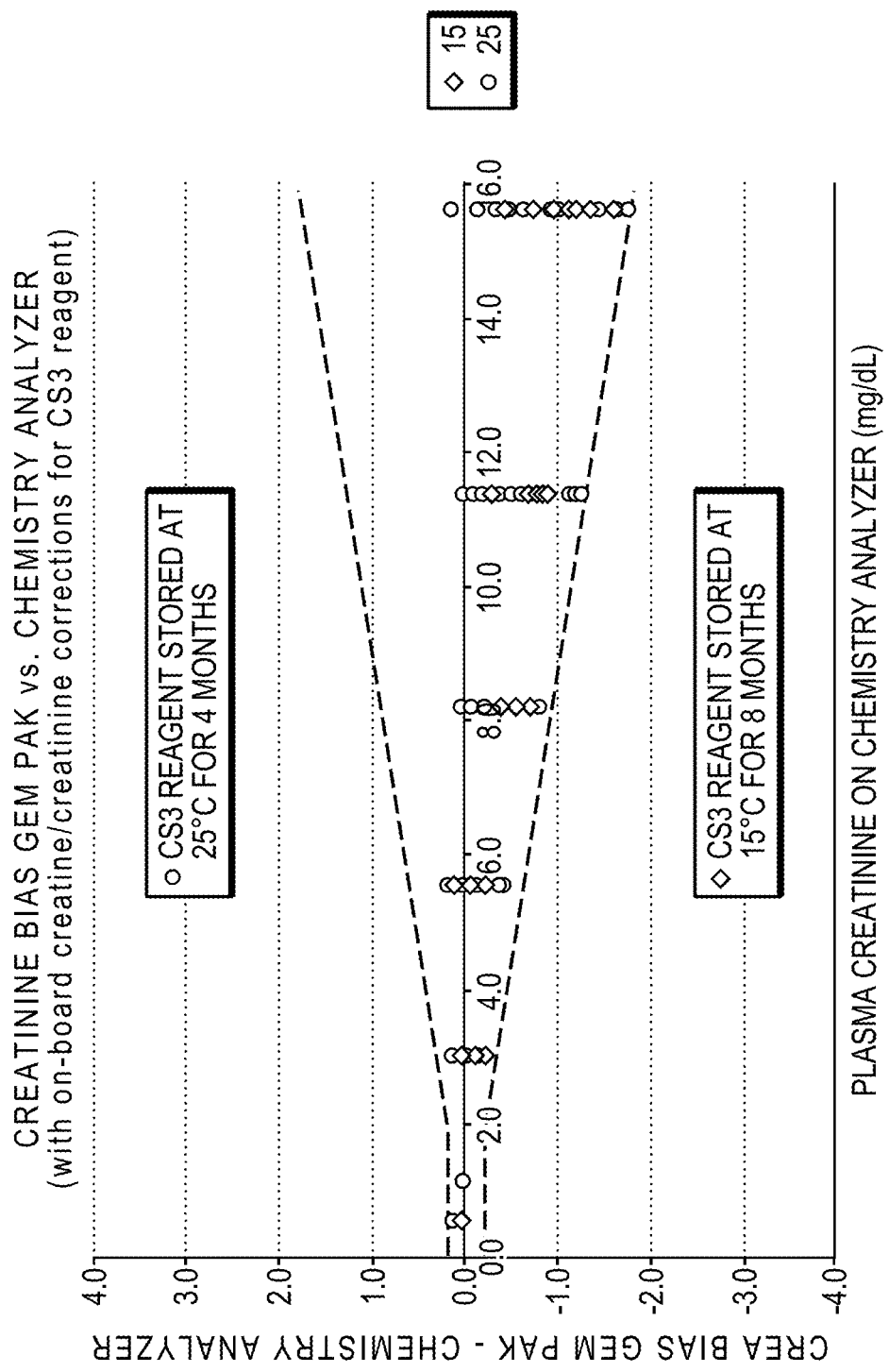

Performance of Whole Blood Creatinine Samples Measured by Creatinine Sensor vs. Plasma Creatinine by Chemistry Analyzer In this study each test cartridge contained a creatinine measuring system comprised of a creatinine sensor, a creatine sensor, and three calibration solutions (CS1, CS2 CS3), there were two groups of cartridges with same reagents but the CS3 reagents went through different storage conditions: data points in green circles were cartridges with CS3 reagent stored 4 months at 25° C. while data points in blue diamonds were cartridges with CS3 reagent stored 8 months at 15° C. Two approaches to establish CS3 creatine and creatinine concentrations for creatinine calibration were investigated: option (a) without real time creatine correction for CS3; and option (b) creatine and creatinine in CS3 were corrected based on real time measured creatine by creatine sensor as described in the present disclosure [as step 1. on page 10]. FIG. 1A indicated by applying option (a) to the creatinine calibration the bias of reported creatinine between two CS3 groups were significant (refer to the data points between green circles and blue diamonds). FIG. 1B demonstrated that by applying option (b) to the creatinine calibration the bias of reported creatinine between two CS3 groups was significantly reduced throughout the sample range to meet designed clinical specifications (refer to again the data points between green circles and blue diamonds).

Example 2

Figure 2A:
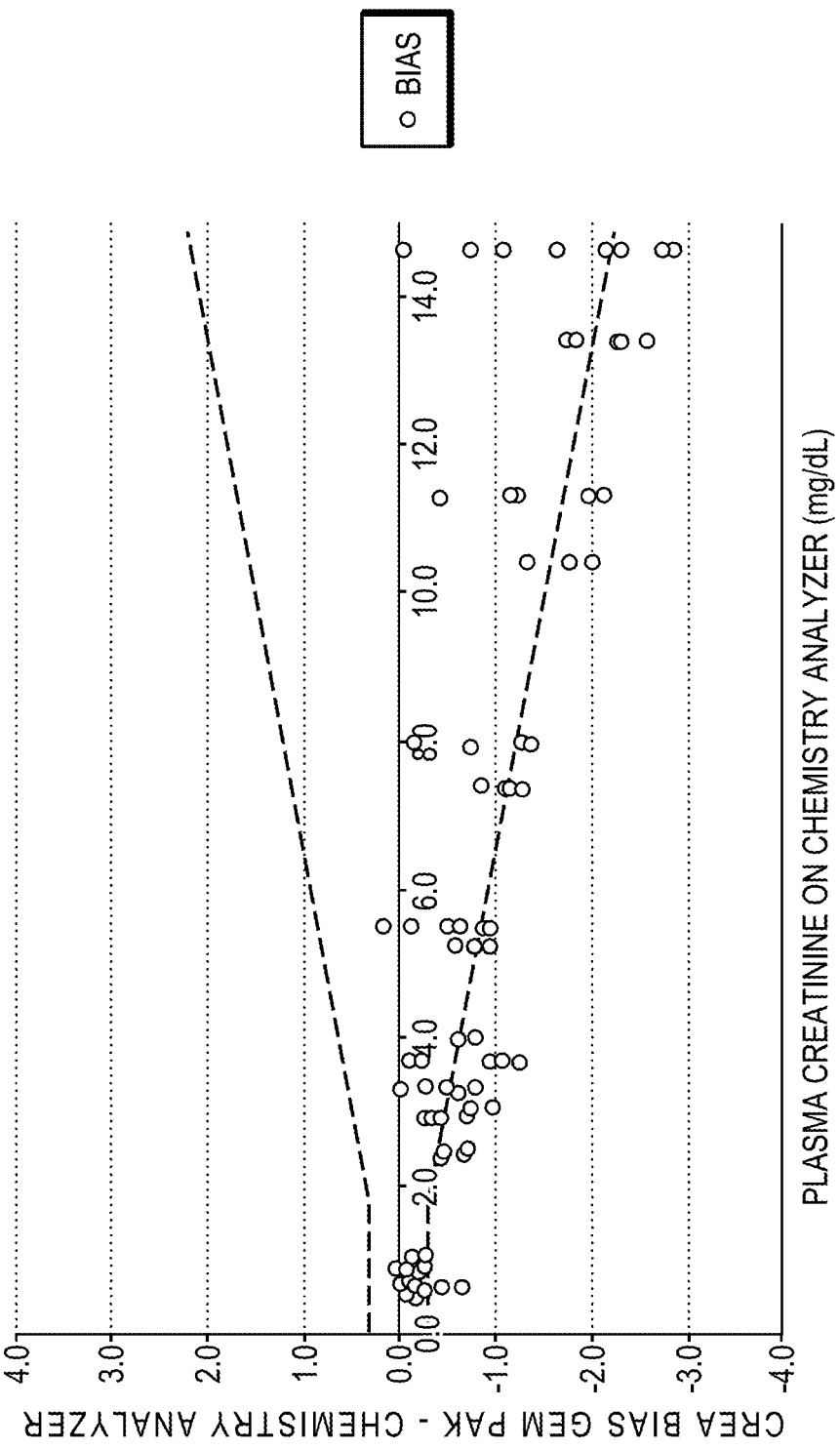
FIGS. 2A-2B show two graphs that depict the bias of creatinine measured by whole blood creatinine biosensor vs. plasma creatinine on a chemistry analyzer.
Figure 2B:
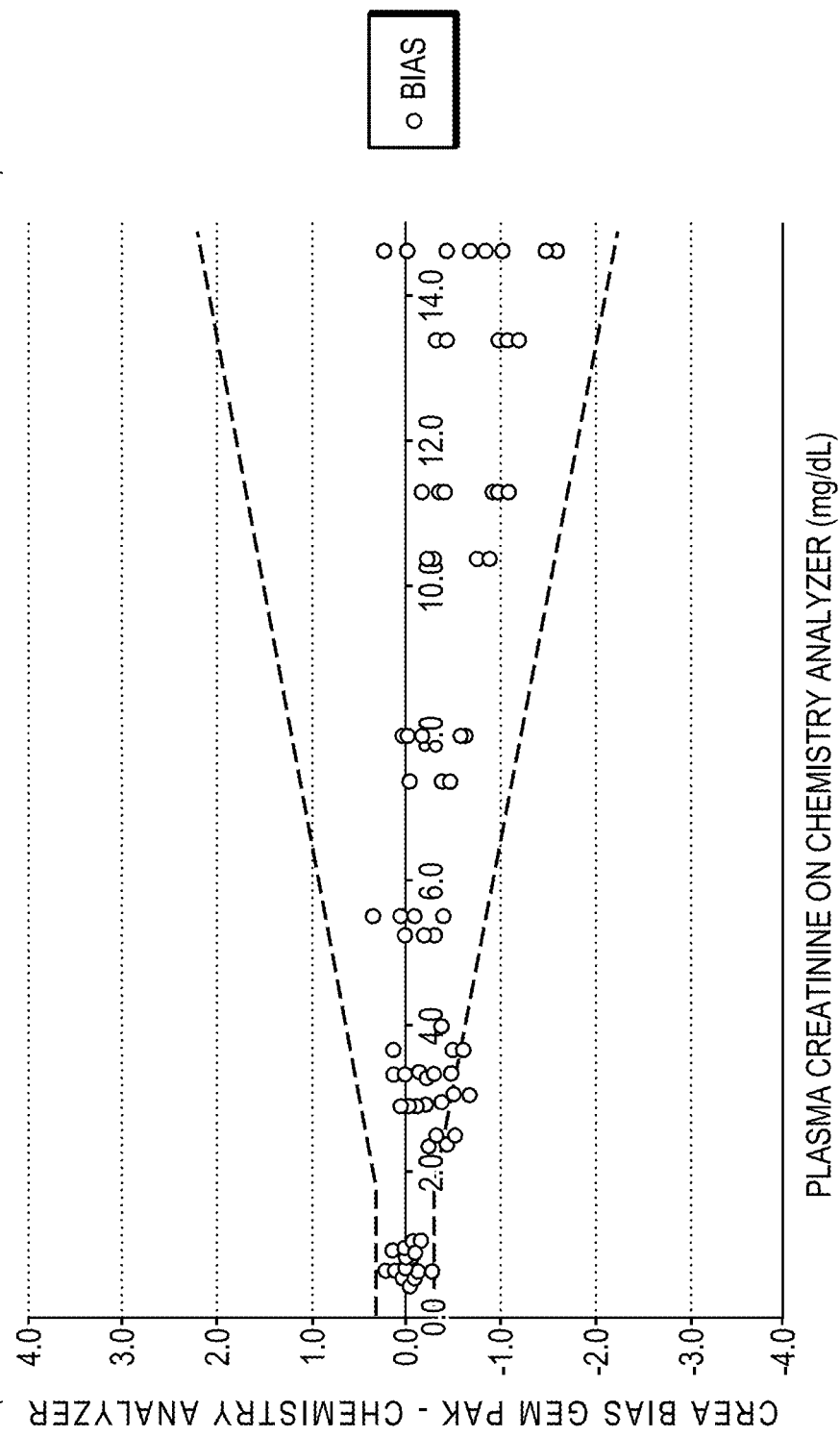
Figure 3:
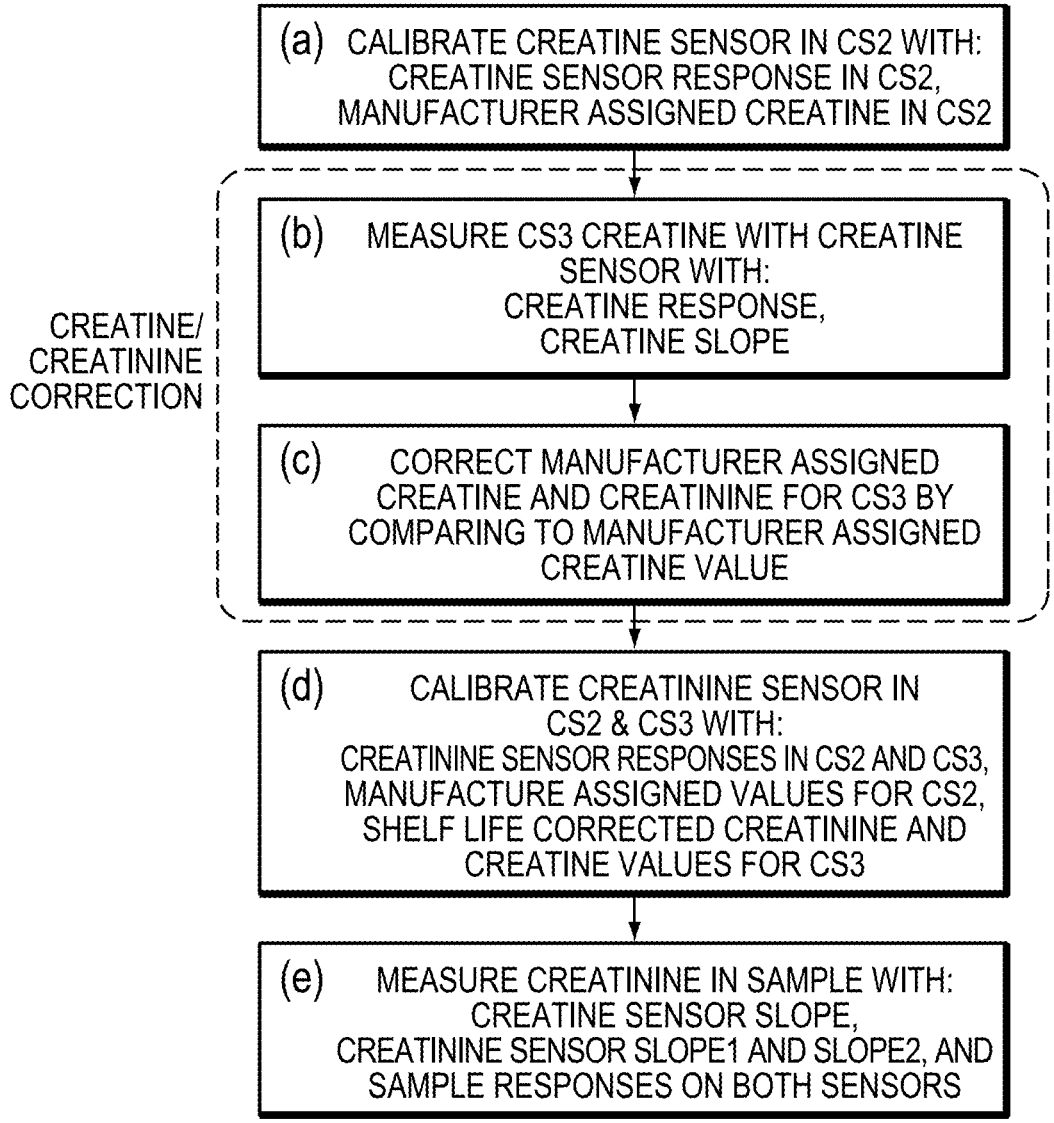
FIG. 3 is a process flow diagram for onboard calibration of creatine and creatinine sensors according to an exemplary embodiment of the disclosure.
Figure 4:
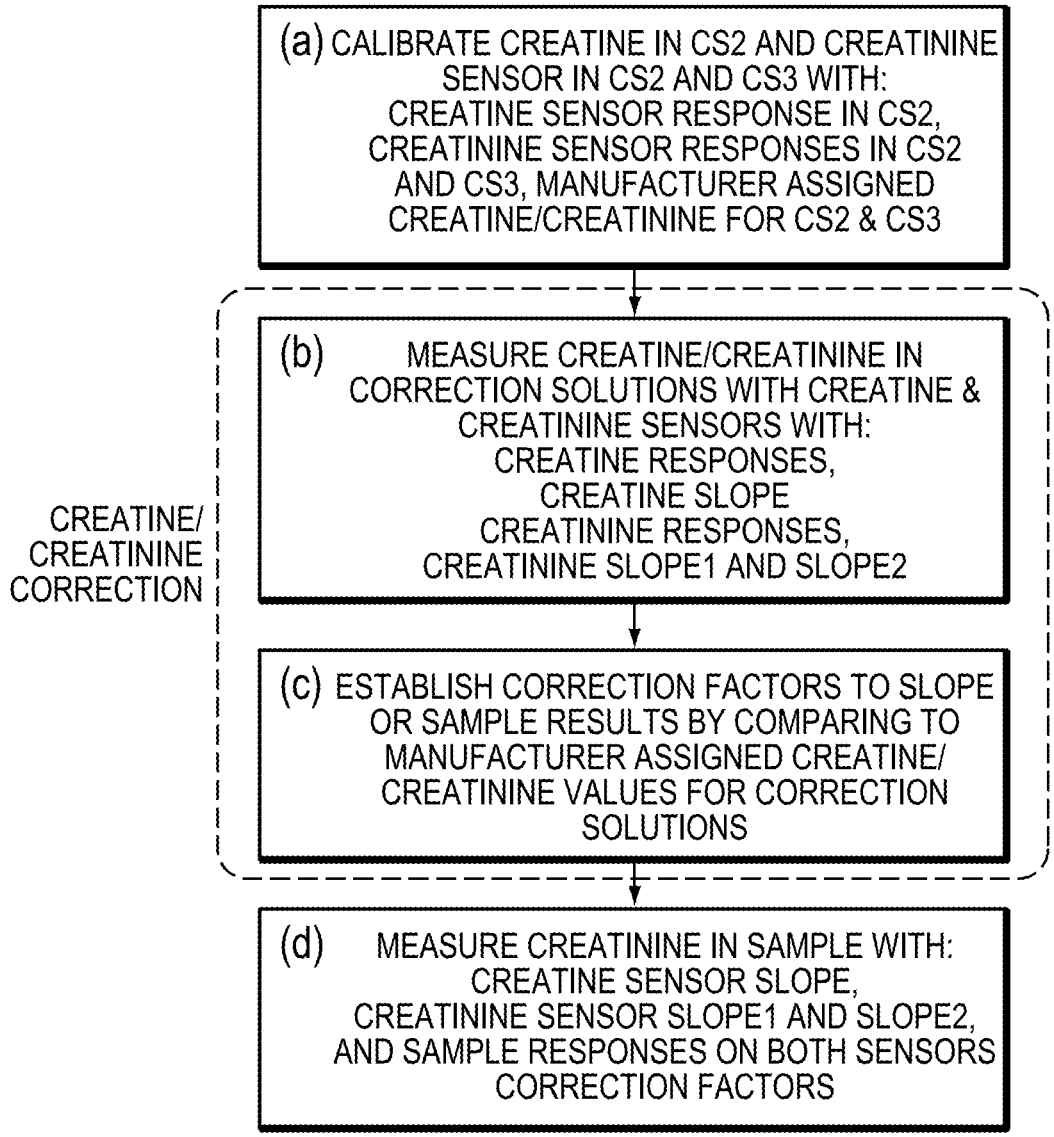
FIG. 4 is a process flow diagram for external calibration of creatine and creatinine sensors according to an exemplary embodiment of the disclosure.

Bias Charts of Whole Blood Creatinine Samples Measured by GEM PAK Cartridges vs. Plasma Creatinine by Chemistry Analyzer With and Without Current Techniques In this study each test cartridge contained a creatinine measuring system, as in previous example, plus two external correction solutions. The creatinine measuring system comprised of a creatinine sensor, a creatine sensor, and three calibration solutions (CS1, CS2, and CS3). All test cartridges had same CS3 reagents stored at ambient conditions for 3 months. Two approaches to establish CS3 creatine and creatinine concentrations for creatinine calibration and calibration correction were investigated: Option (a) without real time creatine correction for CS3, and no secondary correction applied; and Option (b) creatine and creatinine in CS3 were corrected based on real time measured creatine by creatine sensor, and followed by secondary correction based on measured results of two external correction solutions at the beginning of cartridge use life (as described in the present disclosure from step 1-4. on page 10-13). FIG. 2A indicated by applying Option (a) to the creatinine calibration the bias of reported creatinine for all blood samples were noticeably negative biased and somewhat scattered vs. acceptable clinical specifications (refer to the data points in green circles vs. the dotted line). FIG. 2B demonstrated that by applying Option (b) to the creatinine calibration both the negative bias and scattering of reported creatinine in blood samples were significantly reduced throughout the sample range to meet designed clinical specifications (refer to again the data points in green circles vs. the dotted lines).

INCORPORATION BY REFERENCE

All documents cited or referenced herein and all documents cited or referenced in the herein cited documents, together with any manufacturer's instructions, descriptions, product specifications, and product sheets for any products mentioned herein or in any document incorporated by reference herein, are hereby incorporated by reference, and may be employed in the practice of the disclosure.

EQUIVALENTS

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

We claim:

1. A method comprising:
    measuring, using a creatine sensor, a creatine sensor current signal ($\Delta I2$) of a first calibration solution (CS2), where a creatine sensor sensitivity (Slope) for the creatine sensor is based on the creatine sensor current signal ($\Delta I2$), where the first calibration solution (CS2) has a known concentration of creatine (CR_CS2), a known concentration of creatinine (CREA_CS2), and a stable ratio of creatine to creatinine over a range of temperatures for a predefined shelf-life of the first calibration solution (CS2), and where the creatine sensor comprises a diffusion membrane over an enzyme layer and is configured to generate the creatine sensor current signal ($\Delta I2$) based on creatine entering the enzyme through the diffusion membrane;
    measuring, using the creatine sensor, a creatine concentration (MCR_CS3) of a second calibration solution (CS3), where the second calibration solution (CS3) has an initial known creatine concentration (CR_CS3), an initial known creatinine concentration (CREA_CS3), and an unstable ratio of creatine to creatinine that changes over the predefined shelf-life;
    comparing, using equal molar conversion, MCR_CS3 of CS3 to CR_CS3 to obtain a creatine concentration correction factor that corresponds to a difference between the MCR_CS3 and CR_CS3 caused by decay of the creatine concentration over time;
    measuring, using a creatinine sensor: a creatinine sensor current signal ($\Delta I2'$) of CS2 and a creatinine sensor current signal ($\Delta I3'$) of CS3, where the creatinine sensor comprises a diffusion membrane over an enzyme layer and is configured to generate the creatinine sensor current signal ($\Delta I2'$) based on creatinine entering the enzyme through the diffusion membrane;
    obtaining a creatinine concentration of CS3 (MCREA_CS3);
    determining a first creatinine sensor sensitivity (Slope1) based on at least some of the measurements obtained by the measuring performed using the creatinine sensor;
    determining a second creatinine sensor sensitivity (Slope2) based on at least some of the measurements obtained by the measuring performed using the creatinine sensor;
    adjusting Slope1 and Slope2 for the creatinine sensor based on the creatine concentration correction factor;
    estimating a creatinine concentration in a sample based on a sensor current signal of the sample from the creatinine sensor, the Slope1 as adjusted, and the Slope2 as adjusted; and
    estimating a creatine concentration in the sample based on a sensor current signal of the sample from the creatine sensor and the Slope.

2. The method of claim 1, wherein the Slope=$\Delta I2$/CR_CS2.

3. The method of claim 1, wherein the
    Slope1=(MCR_CS3*$\Delta I2'$−CR_CS2*$\Delta I3'$)/(CREA_CS2*MCR_CS3−MCREA_CS3*CR_CS2.

4. The method of claim 1, wherein the
    Slope2=(CREA_CS2*$\Delta I3'$−MCREA_CS3*$\Delta I2'$)/(CREA_CS2*MCR_CS3-MCREA_CS3*CR CS2).

5. The method of claim 1, wherein the stable ratio of creatine to creatinine in the CS2 is 1.5 to 2.

6. The method of claim 1, wherein the CS2 includes about 2-5 mg/dL (milligrams per deciliter) of creatine and about 1-3 mg/dL of creatinine.

7. The method of claim 6, wherein the stable ratio of creatine to creatinine in the CS2 is 1.5 to 2.

8. The method of claim 7, wherein the stable ratio of creatine to creatinine in the CS2 is stable for a minimum of 8 months.

9. The method of claim 1, wherein the CS3 includes between 2 and 8 mg/dL (milligrams per deciliter) of creatine and between 0 and 1 mg/dL of creatinine.

10. The method of claim 9, wherein the unstable ratio of creatine to creatinine in (milligrams per deciliter) CS3 is 4 to 70.

11. The method of claim 1, further comprising:
    adjusting the estimate of the creatine concentration in the sample using the creatine concentration correction factor.

12. The method of claim 1, wherein the CS2 is different from the CS3.

13. A method, comprising:
    measuring, using a creatine sensor, a creatine sensor current signal ($\Delta I2$) of a first calibration solution (CS2), where a creatine sensor sensitivity (Slope) for the creatine sensor being is based on the creatine sensor current signal ($\Delta I2$), where the first calibration solution (CS2) has a known concentration of creatine (CR_CS2), a known concentration of creatinine (CREA_CS2), and a stable ratio of creatine to creatinine over a range of temperatures for a predefined shelf-life of the first calibration solution (CS2), and where the creatine sensor comprises a diffusion membrane over an enzyme layer and is configured to generate the creatine sensor current signal ($\Delta I2$) based on creatine entering the enzyme through the diffusion membrane;
    measuring, using a creatinine sensor, a creatinine sensor current signal ($\Delta I2'$) of the first calibration solution (CS2) and a creatinine sensor current signal ($\Delta I3'$) of a second calibration solution (CS3), where the second calibration solution (CS3) has an initial known creatine concentration (CR_CS3), an initial known creatinine concentration (CREA_CS3), and an unstable ratio of creatine to creatinine that changes over the predefined shelf-life, wherein and where the creatinine sensor comprises a diffusion membrane over an enzyme layer and is configured to generate the creatinine sensor current signal ($\Delta I2'$) based on creatinine entering the enzyme through the diffusion membrane;

determining a first creatinine sensor sensitivity (Slope1) based on at least some of measurements obtained by the measuring performed using the creatinine sensor;

determining a second creatinine sensor sensitivity (Slope2) based on at least some of the measurements obtained by the measuring performed using the creatinine sensor;

measuring, using the creatine sensor, a creatine concentration of a first correction solution (COR1) having a known creatine concentration (CR_COR1), a known creatinine concentration (CREA_COR1), and a stable ratio of creatine to creatinine;

measuring, using the creatinine sensor, a creatinine concentration of the first correction solution (COR1);

comparing, using equal molar conversion, the creatine concentration measured by the creatine sensor to the known creatine concentration (CR_COR1) of the first correction solution and comparing, using equal molar conversion, the creatinine concentration measured by the creatinine sensor to the known creatinine concentration (CREA_COR1) of the first correction solution to determine, respectively, a creatine concentration correction factor and a creatinine concentration correction factor;

adjusting Slope1 and Slope2 for the creatinine sensor based on the creatine concentration correction factor; and estimating a creatinine concentration in a sample based on values of the Slope, the Slope1 as adjusted, the Slope2 as adjusted, the creatine concentration correction factor, the creatinine concentration correction factor, the creatine sensor current signal ($\Delta I2$), and the creatinine sensor current signal ($\Delta I2'$).

14. The method of claim 13, wherein the COR1 comprises a concentration of creatine between 0 and 2 mg/dL and a concentration of creatinine between 1 and 3 mg/dL (milligrams per deciliter).

15. The method of claim 13, further comprising:
measuring, using the creatine sensor, a creatine concentration of a second correction solution (COR2) having a known creatine concentration (CR_COR2) and a known creatinine concentration (CREA_COR2), wherein the second correction solution (COR2) has a stable ratio of creatine to creatinine; and measuring, using the creatinine sensor, a creatinine concentration (CREA_COR2) of the COR2.

16. The method of claim 15, wherein the Slope1= (CR_CS3*$\Delta I2'$−CR_CS2*$\Delta I3'$)/(CREA_CS2*CR_CS3−CREA_CS3*CR_CS2).

17. The method of claim 15, wherein the Slope2=(CREA_CS2*$\Delta I3'$−CREA_CS3*$\Delta I2'$)/(CREA_CS2*CR_CS3−CREA_CS3*CR_CS2).

18. The method of claim 13 wherein the creatine concentration correction factor is used to adjust bias associated with the creatine sensor and the creatinine concentration correction factor is used to adjust bias associated with the creatinine sensor.

19. A system comprising:
a creatine sensor;
a creatinine sensor;
a first calibration solution (CS2) having a known concentration of creatine (CR_CS2), a known concentration of creatinine (CREA_CS2), and a stable ratio of creatine to creatinine over a range of temperatures for a predefined shelf-life of the first calibration solution (CS2);

a second calibration solution (CS3) having an initial known creatine concentration (CR_CS3), an initial known creatinine concentration (CREA_CS3), and an unstable ratio of creatine to creatinine that changes over the predefined shelf-life;

one or more processing devices in communication with the creatine sensor and the creatinine sensor, the one or more processing devices being configured to execute instructions; and memory storing the instructions that are executable by the one or more processing devices to perform operations comprising:

obtaining, from the creatine sensor, a creatine sensor current signal ($\Delta I2$) of the first calibration solution (CS2), where a creatine sensor sensitivity (Slope) for the creatine sensor is based on the creatine sensor current signal ($\Delta I2$), and where the creatine sensor comprises a diffusion membrane over an enzyme layer and is configured to generate the creatine sensor current signal ($\Delta I2$) based on creatine entering the enzyme through the diffusion membrane;

obtaining, from the creatine sensor, a creatine concentration (MCR_CS3) of the second calibration solution (CS3);

comparing, using equal molar conversion, the MCR_CS3 of the CS3 to the CR_CS3 to obtain a creatine concentration correction factor that corresponds to a difference between the MCR_CS3 and CR_CS3 caused by decay of the creatine concentration over time;

obtaining, from the creatinine sensor: a creatinine sensor current signal ($\Delta I2'$) of CS2, a creatinine sensor current signal ($\Delta I3'$) of CS3, where the creatinine sensor comprises a diffusion membrane over an enzyme layer and is configured to generate the creatinine sensor current signal ($\Delta I2'$) based on creatinine entering the enzyme through the diffusion membrane;

obtaining a creatinine concentration of CS3 (MCREA_CS3);

determining a first creatinine sensor sensitivity (Slope1) based on at least some measurements obtained from the creatinine sensor;

determining second creatinine sensor sensitivity (Slope2) based on at least some of the measurements obtained from the creatinine sensor;

adjusting Slope1 and Slope2 for the creatinine sensor based on the creatine concentration correction factor;

estimating a creatinine concentration in a sample based on a sensor current signal of the sample from the creatinine sensor, the Slope1 as adjusted, and the Slope2 as adjusted; and estimating a creatine concentration in the sample based on a sensor current signal of the sample from the creatine sensor, the Slope, and the creatine concentration correction factor.

20. The system of claim 19, wherein the
Slope1=(MCR_CS3*$\Delta I2'$−CR_CS2*$\Delta I3'$)/(CREA_CS2*MCR_CS3−MCREA_CS3*CR_CS2); and the
Slope2=(CREA_CS2*$\Delta I3'$−MCREA_CS3*$\Delta I2'$)/(CREA_CS2*MCR_CS3−MCREA_CS3*CR_CS2).

* * * * *